United States Patent [19]

Poirier

[11] Patent Number: 5,141,447

[45] Date of Patent: Aug. 25, 1992

[54] PLUG TOGETHER SURFACE MOUNTED POWER DISTRIBUTION SYSTEM

[75] Inventor: Charles L. Poirier, Fort Wayne, Ind.

[73] Assignee: Group Dekko International, LaOtto, Ind.

[21] Appl. No.: 686,178

[22] Filed: Apr. 16, 1991

[51] Int. Cl.⁵ .............................................. H01R 4/60
[52] U.S. Cl. ..................................... 439/207; 439/32; 439/209
[58] Field of Search ............................... 439/202–215, 439/216, 32

[56] References Cited

U.S. PATENT DOCUMENTS

| | | |
|---|---|---|
| 1,718,252 | 6/1929 | Putnam . |
| 1,718,253 | 6/1929 | Putnam . |
| 3,464,052 | 8/1969 | Hukin . |
| 4,056,297 | 11/1977 | Gartung . |
| 4,199,206 | 4/1980 | Haworth et al. . |
| 4,800,695 | 1/1989 | Menchetti . |
| 4,874,322 | 10/1989 | Dola et al. ................. 439/210 |
| 4,875,871 | 10/1989 | Booty et al. ............... 439/209 |
| 4,952,163 | 8/1990 | Dola et al. ............... 439/207 X |

FOREIGN PATENT DOCUMENTS 1344398 10/1963 France ............................ 439/207

Primary Examiner—Eugene F. Desmond

[57] ABSTRACT

A prewired electrical distribution system of the type which may be fixed to and extend along a surface such as wall for distributing electrical energy is disclosed. The system employs relatively rigid conductor carrying members of various lengths interconnected by substantially identical relatively rigid couplers and may be easily and quickly assembled. Each of the relatively rigid conductor carrying members includes an elongated channel of relatively uniform cross-section throughout its extent with that channel being longitudinally divided into at least two separate raceways, one for receiving power carrying conductors and the other for receiving communication wiring. The channel is formed from two joinable, typically extruded plastic members, and one metal formed member adapted to be fastened, as by screws, to a wall or other surface. The first member is adapted to snap over the metal member enclosing the power carrying conductor raceway and forming a portion of the communication wiring raceway, and the second member is adapted to close the communication wiring raceway.

28 Claims, 4 Drawing Sheets

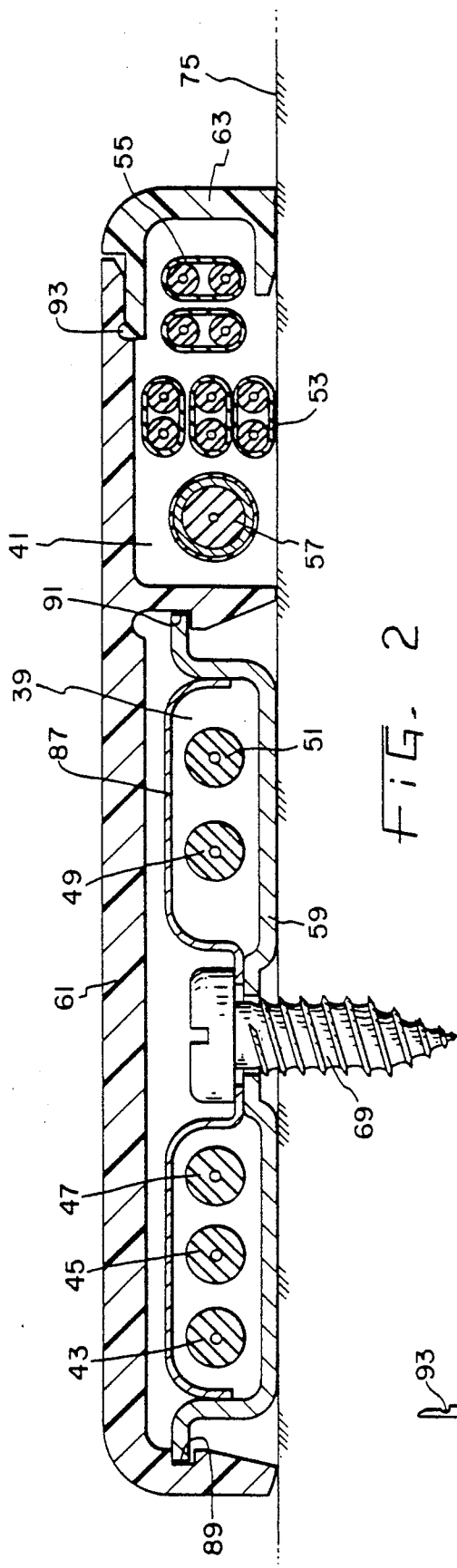
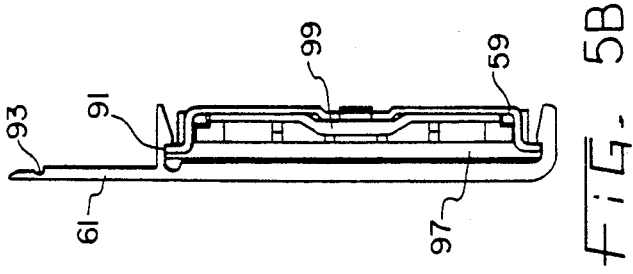

PLUG TOGETHER SURFACE MOUNTED POWER DISTRIBUTION SYSTEM

SUMMARY OF THE INVENTION

The present invention relates generally to power distribution systems of the type which may be configured by the user. In particular, the present invention provides a plurality of pluggably interconnectable rigid conductor carrying portions and device (e.g. receptacle as well as coupler) portions which may be interconnected and fastened to, a wall, or other surface along with protective covers which are thereafter fastened to the conductor carrying or bus portions.

Prewired power distribution systems run the spectrum from the conventional extension cord to relatively sophisticated prewiring systems for office partitions and similar modular furnishings with power and/or communications wiring running in raceways along the top or bottom of the partitions.

For example, U.S. Pat. Nos. 2,192,899; 2,234,745; and 3,308,416 teach continuous relatively rigid two conductor electrical outlet strips resembling conventional baseboard trim. The U.S. Pat. No. 2,192,899 patent requires a special outlet adapter into which a conventional plug may be inserted while the other two patented arrangements allow for the direct insertion of the conventional plug.

U.S. Pat. Nos. 2,250,513 and 2,979,686 also show continuous relatively rigid two conductor electrical outlet strips resembling conventional baseboard trim, but include rigid interconnecting elements for connecting two outlet strips together where no plug access is available.

U.S. Pat. No. 2,952,829 discloses a series of interconnectable rigid sticks some of which have a series of discrete receptacles therealong. This arrangement is essentially a series of rigid extension cords. Similar discrete receptacle locations along a rigid member, but with flexible interconnecting jumpers is shown in U.S. Pat. No. 4,056,297. In this last patented arrangement, the strips are fastened along the lower edge of movable partitions.

A series of rigid conductor carrying strips upon which such movable partitions rest is shown in U.S. Pat. No. 4,043,626. In this patented arrangement, the strips are interconnected by rigid jumpers and conventional receptacle boxes are connected through special purpose receptacles at selected locations along the strips.

The concept of conventional receptacle boxes connecting to the conductors within a rigid strip at selected locations through special purpose receptacles is also shown in U.S. Pat. Nos. 4,278,834 and 4,775,328. In these two patented arrangements, the rigid strips are located near the bottom of movable partitions and interconnected by flexible jumpers. In the earlier of these patents, the connection is always to the same single circuit while the later allows for connection to a selected one of several different circuits.

U.S. Pat. No. 4,688,869 teaches rigid track elements each having a plurality of generally parallel conductor bars for receiving the conductive blades (each between a selected pair of bars) of conventional receptacle boxes as well as other modules at almost all locations along the conductor bars. Flexible jumpers provide interconnection between adjacent track elements. A somewhat similar concept in a baseboard style enclosure having a back member which is fastened to a wall and a cover plate which snaps in place is shown in U.S. Pat. No. 3,248,576. In this last patented arrangement, the conductors which are disposed in the baseboard are split axially to form a pair of D-shaped wire halves, and T-shaped connectors extend between the wire halves and forward to provide a male terminal to which outlets fused at their point of attachment may be fastened.

Recently, a far east manufacturer has introduced a two conductor continuous relatively rigid outlet strip resembling conventional baseboard trim having a separate channel for communications wiring and adapted to receive a twist-in-place receptacle anywhere along the continuous strip. The communications access locations are independent of the receptacles and two separate front cover portions are independently positioned over the communications and power portions of the strip once it is fastened in place.

Of the above systems, only U.S. Pat. Nos. 2,192,899; 2,234,745; 2,250,513; 2,952,829; 2,979,686; 3,308,416; and the recent far east structure are surface mounted while the rest are disposed with or beneath the panel. Each of these surface mounted systems is limited to a simple two conductor system. None of these surface mounted systems provides for any communication circuitry. The only one of these surface mount patents which provides anything other than an essentially continuous outlet location throughout the length of the strip (the U.S. Pat. No. 2,952,829) utilizes integrally molded receptacle locations which form an integral part of the strip itself. In other words, all except for this "rigid extension cord" are of generally uniform cross-sectional configuration throughout their longitudinal extent. Of these surface mounted power distribution systems, only the U.S. Pat. No. 2,192,899 utilizes an intermediate member or adapter to interconnect the power carrying conductors with a conventional convenience plug. All the other surface mount systems receive such a plug directly into the strip and into contact with the power carrying conductors. In all the surface mounted systems, access to the power carrying conductors is fixed to partially obscure those conductors while allowing connection by the prongs of a plug. In other words, access in all of these surface mount systems is fixed and can not be improved, for example, to allow ready connection to the circuit, and then modified to provide a greater degree of safety from inadvertent contact with the power carrying conductors. None of these surface mount systems are capable of receiving power at other than the ends of the power strips. None of these surface mount systems have suggested blank or dummy sections having no power carrying capability for decorative purposes or for communications wiring only.

The presently preferred embodiment of the present invention is a plug together surface mounted two circuit power distribution network with integral communications and data routing channel. It features a low profile with no visible mounting means ideally suiting it to the contemporary office environment. Surface installation requires no changes to existing walls or wall systems and is accomplished independent of the wall erection at great savings in time over conventional wiring.

With the exception of power-in, all power connections are made by plugging components together. Power-in components have no change in profile and are available for feeding from either end of a run or anywhere within a run. They can also be supplied with a factory installed conduit whip for feeding through the wall to a junction box.

The system complement of components allows routing anywhere on the wall and adjacent walls with a constant orientation of communications on top. Blank components provide a means of using portions of a run for aesthetic purposes only. All devices have a common width allowing route specifying by a system centerline method regardless of the devices selected.

Conductor carrying members (bus sticks) are offered in various standard as well as custom lengths to accommodate any system layout. Internal mounting holes are on a ½ inch pitch throughout the system providing compatibility with any stud arrangement. In addition, a unique indistinguishable telescoping stick provides a 3 inch adjustment for fitting between corners or device/-corner combinations.

The communications routing channel is completely independent of the power section and features a drop-in design eliminating the need to "fish" conductors through. Ample space is provided for a coaxial data cable and several single pair telephone lines. A slide cover above the power receptacle body provides the means of porting out and covering the entry points from the wall. Various covers to accept standard BNC devices and phone jacks as well as custom covers are possible.

Among the several objects of the present invention may be noted the provision, in light of the forgoing, of an improved surface mount power distribution system; the provision of a surface mountable power and communications distribution system; the provision of a surface mountable power distribution system having the capacity for power in connections throughout its extent; and the provision of a rigid (inflexible) power distribution strip capable of accommodating variations in the separation between its neighboring power distribution strips. These as well as other objects and advantageous features of the present invention will be in part apparent and in part pointed out hereinafter.

In general, a prewired electrical distribution system of the type to be fastened to and extend along a wall for distributing electrical energy has a plurality of relatively rigid conductor carrying members with like first connectors fixed to opposite ends. A plurality of substantially identical relatively rigid couplers provide interconnection between pairs of conductor carrying members. The couplers have like second connectors fixed to their opposite ends with each second connector adapted to mate with a corresponding first connector of a relatively rigid conductor carrying member. There is at least one (and frequently more) additional relatively rigid coupler which is unlike the plurality of substantially identical couplers, yet has the like second connectors fixed to the opposite ends to provide interconnection between pairs of conductor carrying members as before. One additional coupler includes electrical receptacle means for receiving a conventional plug to supply power thereto. Another additional coupler may also provide interconnection between pairs of conductor carrying members extending generally perpendicular to one another.

Also in general and in one form of the invention, a prewired electrical distribution member is adapted to extend along a wall and has a plurality of relatively rigid conductor carrying members each comprising an elongated channel of relatively uniform cross-section throughout its extent. The channel is longitudinally divided into at least two separate raceways, one for receiving power carrying conductors and the other for receiving communication wiring. The elongated channel includes a first portion adapted to be fastened to a wall, and a cover for the first portion which encloses the power carrying conductor raceway with that cover also forming at least a portion of the communication wiring raceway. Typically, the elongated channel is formed from three joinable members, the first adapted to be fastened to a wall, the second adapted to snap over the first enclosing the power carrying conductor raceway and forming in conjunction with the wall, a portion of the communication wiring raceway, and the third closing the communication wiring raceway after the wiring is in place thereby allowing wiring to be easily placed rather than "fished" through an already enclosed raceway.

BRIEF DESCRIPTION OF THE DRAWING

FIG. 2 is a view in cross-section along line 2—2 of FIG. 1;

FIGS. 5A–5D illustrate the way in which selected conductor carrying members are made to telescope.

Corresponding reference characters indicate corresponding parts throughout the several views of the drawing.

The exemplifications set out herein illustrate a preferred embodiment of the invention in one form thereof and such exemplifications are not to be construed as limiting the scope of the disclosure or the scope of the invention in any manner.

DESCRIPTION OF THE PREFERRED EMBODIMENT

Figure 1:
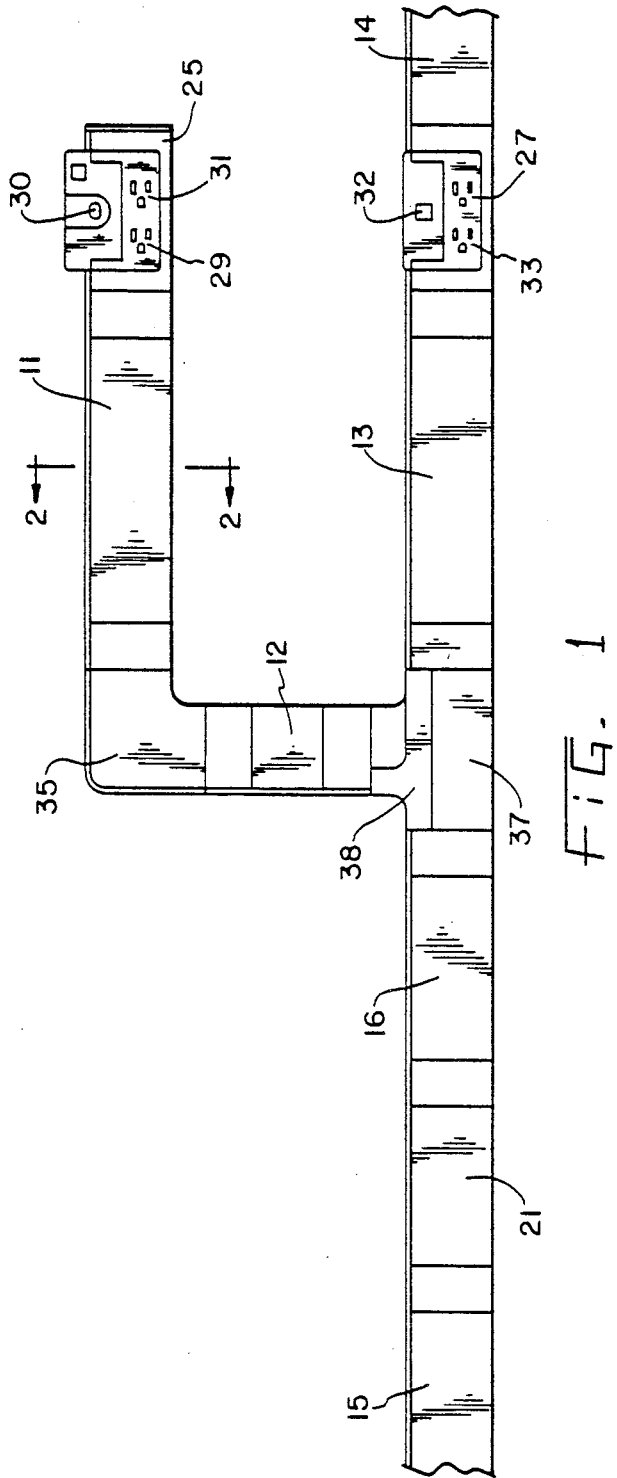
FIG. 1 is an elevation view of an illustrative portion of a surface mounted power distribution system according to the invention in one form.
Figure 3:
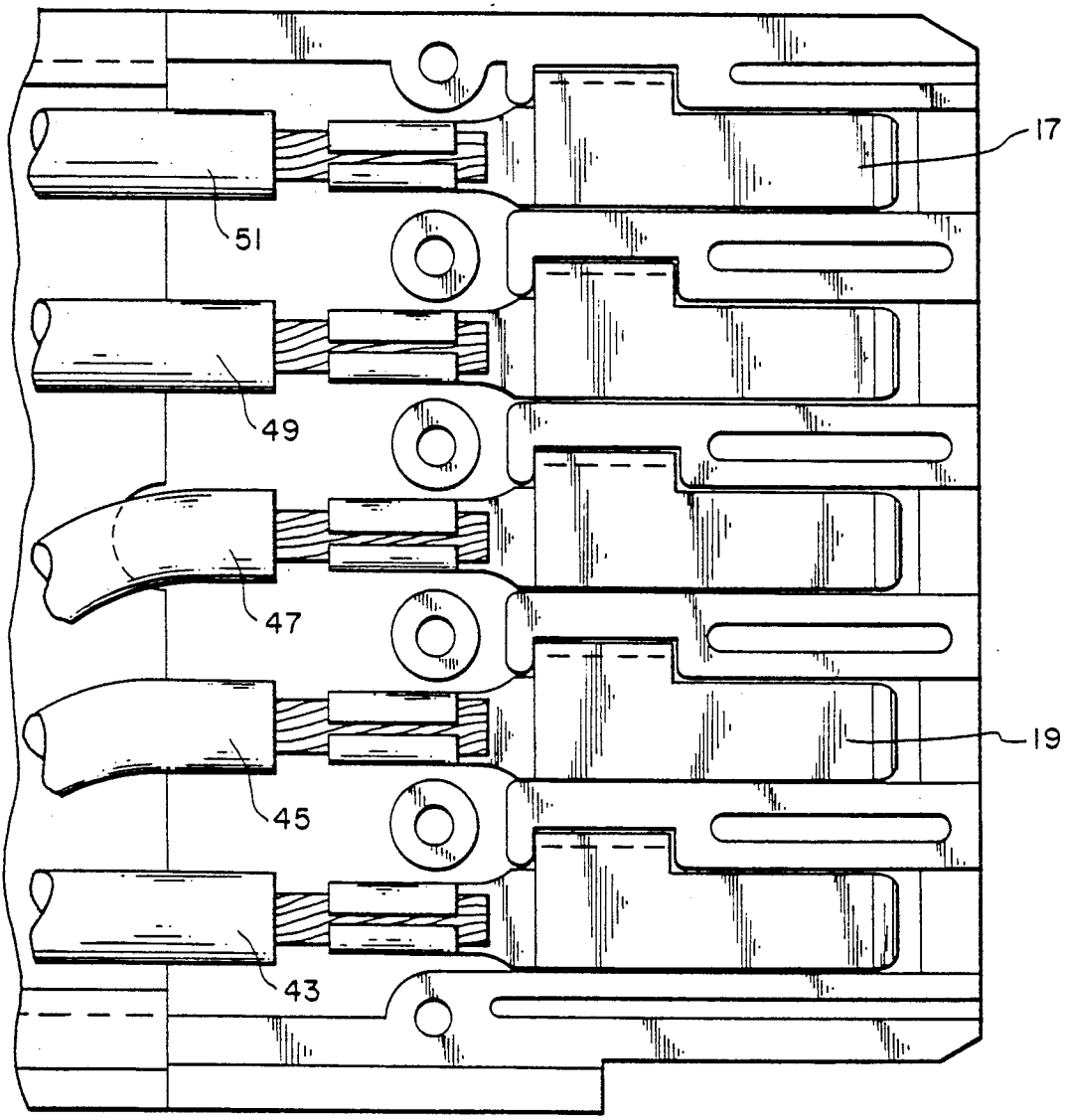
FIG. 3 is a plan view of the connector portion of one relatively rigid conductor carrying member with the power lines therein.

The prewired distribution member of FIG. 1 is typically positioned to extend along a movable or a fixed wall, or other structure for distributing electrical energy. There are a plurality of relatively rigid conductor carrying members such as 11, 12, 18, 14, 15 and 16 each of which has like first connectors such as 17 and 19 (best seen in FIGS. 3 and 4) which connectors are fixed to opposite ends of the conductor carrying members. A plurality of substantially identical relatively rigid couplers such as 21 have like second connectors (23 in FIG. 4) fixed to opposite ends thereof with each second connector adapted to mate with a corresponding first connector in the manner shown in FIG. 4 so that each coupler such as 21 may provide interconnection between pairs of conductor carrying members such as 15 and 16. There are additional relatively rigid couplers such as 25 and 27 which are unlike the coupler 21 (a complete system would include a plurality of substantially identical couplers 21). These additional couplers have like second connectors the same as connectors such as 23 fixed to the opposite ends and each second connector is, as before, adapted to mate with a corresponding first connector like 17 to provide an interconnection between pairs of conductor carrying members, for example, between 13 and 14 in FIG. 1. The additional couplers such as 25 and 27 differ from the simple couplers like 21 by including electrical receptacles such as 29, 31 and 33 for receiving a conventional plug to supply power to whatever electrical appliance or device may be connected thereto. These couplers may also include communications connections such as 30 and 32 as desired. A further relatively rigid coupler 35 which is unlike either 21 or 25 has second connectors like 23 fixed to orthogonally adjacent edges with each of the second connectors again adapted to mate with a corresponding first connector so as to provide interconnection between pairs of conductor carrying members such as 11 and 12 which are extending generally perpendicular to one another.

At least one more relatively rigid coupler 37 which is unlike any of the couplers 35, 25, or 21 again has second connectors like 23 fixed to opposite ends and to an orthogonally adjacent edge. This additional coupler, essentially a "T", provides interconnection between pairs of conductor carrying members such as 13 and 12 which extending generally perpendicular to one another as well as providing interconnection between pairs of collinear conductor carrying members such as 13 and 16 which extend in a common direction generally parallel to one another. Notice the protrusion at 88 where the communications wires from section 13 pass in front of the power wires and thereafter up the left side of coupler 12 to again be on the top in section 11.

Each of the relatively rigid conductor carrying members such as 11 comprises an elongated channel of relatively uniform cross-section throughout its extent (except for the terminals) as best seen in FIG. 2. The channel is longitudinally divided into two separate compartments or raceways 39 and 41, with raceway 39 receiving power carrying conductors 43, 45, 47, 49 and 51 while raceway 41 receives communication Wiring and extends for the full length of the span of several members. For example, lines 43 and 45 may be two hot lines for two separate circuits, lines 51 and 49 their respective neutrals and line 47 a common or shared ground. The communication wiring may include twin lead telephone lines such as 53 and 55 as well as one or more coaxial lines 57 for data communications such as computer networks and the like. The elongated channel is formed from three elongated joinable members 59, 61 and 63, of which 61 and 63 are typically extruded plastic members while 59 is a formed metal base. A further metal cover 87 may be added as an additional safety feature for preventing inadvertent electrical shock. The first member or strip 59 has a series of holes such as 65 and 67 in FIG. 5A through which screws such as 69 may pass to fasten strip 59 to a wall. The second strip 61 snaps over the first with notches 91 and 89 holding it in position so as to enclose the power carrying conductor compartment 89 and also form, in conjunction with wall surface 75, a portion of the communication wiring compartment 41. This allows the communication wiring to be easily laid in place before the third or top cap 63 is snapped in place with the notch and tab engaging at 93 holding the cover or cap 68 in place and closing the communication wiring compartment.

The relatively rigid conductor carrying members 11-16 are of varying lengths, but otherwise substantially identical. In addition to selecting varying length members such as 11-16, adaptation to a particular length may be accomplished by the conductor carrying member as shown in FIGS. 5A-5D which is unlike any of the thus far discussed relatively rigid conductor carrying members. This further relatively rigid conductor carrying member again has first connectors like 17 fixed to opposite ends thereof, however, this member is longitudinally telescopically retractable and extendable to compensate for variations in the separation between adjacent relatively rigid couplers. Along with the conventional insulated wires such as 51 in FIGS. 2, 3 and 4, the telescoping section conductors of FIG. 5 are each a slidingly coupled pair of contacts 77 and 79 with spring wipers 81 and 84 for maintaining good electrical connection between those sliding contacts. The contacts such as 77 and wiper such as 81 are preferably portions of a one piece terminal. This adjustable section has upper 97 and lower 99 plastic surfaces. Terminal 79 is crimped at 95 to a conventional insulated conductor like 43 etc. in FIG. 2 with terminal 77 being similarly crimped to a conductor extending out the opposite end.

Figure 4:
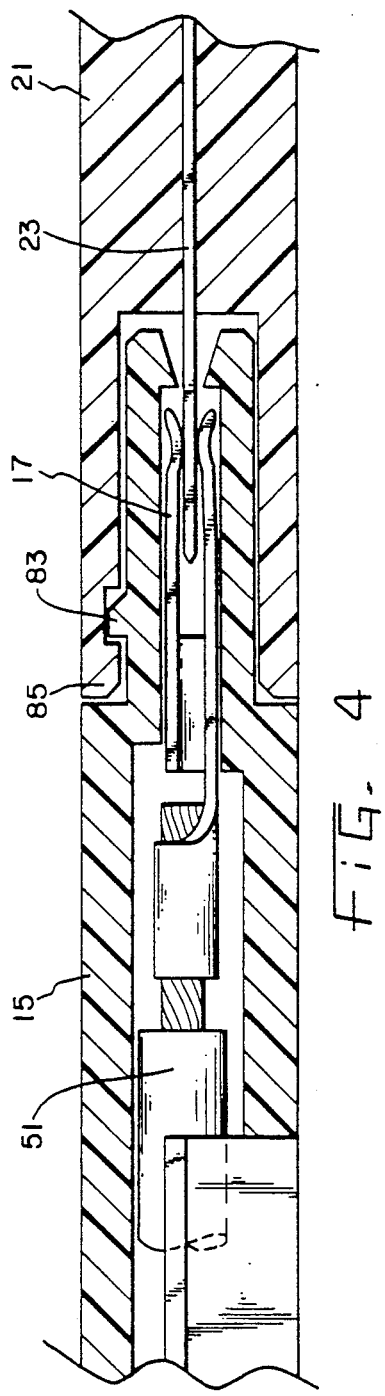
FIG. 4 is a cross-sectional view orthogonal to FIG. 3 illustrating interconnection between the connectors of the conductor carrying members and the couplers.
Figure 5A:
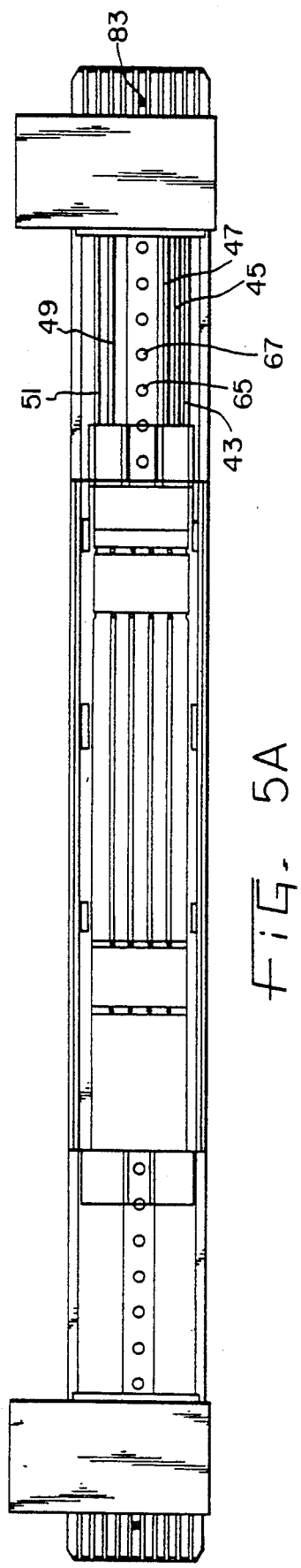
Figure 5C:
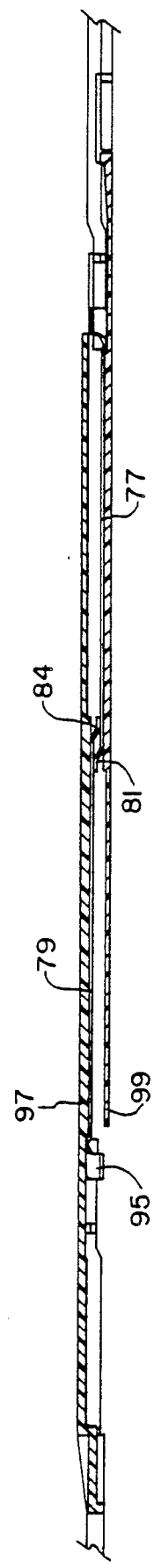
Figure 5D:

Comparing FIGS. 4 and 5A, it will be noted that two sections are joined by the interengagement of a protrusion 83 and overlying tab 85. The lines above and below protrusion 83 in FIG. 5A are grooves formed in the end of the plastic member (the ends of member 15 has similar grooves and mating grooves are formed in the mating plastic member such as 21) to help prevent accidental access to a hot conductor such as 28 in FIG. 4. These prevent insertion of a ¼ inch probe, a common safety standard.

From the foregoing, it is now apparent that a novel self-mating connector and self-mating terminal therefor have been disclosed meeting the objects and advantageous features set out hereinbefore as well as others, and that numerous modifications as to the precise shapes, configurations and details may be made by those having ordinary skill in the art without departing from the spirit of the invention or the scope thereof as set out by the claims which follow.

What is claimed is:

1. A prewired electrical distribution system adapted to be fixed to and extend along a wall for distributing electrical energy comprising:

a plurality of relatively rigid conductor carrying members having like first connectors fixed to opposite ends thereof, each of the relatively rigid conductor carrying members including an elongated channel of relatively uniform cross-section throughout its extent, the channel being longitudinally divided into at least two separate compartments, one for receiving power carrying conductors and the other for receiving communication wiring;

a plurality of substantially identical relatively rigid couplers having like second connectors fixed to opposite ends thereof with each second connector adapted to mate with a corresponding first connector whereby the couplers may provide interconnection between pairs of conductor carrying members; and at least one additional relatively rigid coupler unlike the plurality of substantially identical couplers and having like second connectors fixed to the opposite ends with each second connector adapted to mate with a corresponding first connector whereby the additional coupler may also provide interconnection between pairs of conductor carrying members, the additional coupler further including electrical receptacle means for receiving a conventional plug to supply power thereto.

2. The prewire electrical distribution member of claim 1 further comprising at least one further relatively rigid coupler unlike the at least one additional relatively rigid coupler and unlike the plurality of substantially identical couplers, the further coupler having like second connectors fixed to orthogonally adjacent edges with each second connector adapted to mate with a corresponding first connector whereby the additional coupler may also provide interconnection between pairs of conductor carrying members extending generally perpendicular to one another.

3. The prewired electrical distribution member of claim 2 further comprising at least one more relatively rigid coupler unlike the further relatively rigid coupler, unlike the at least one additional relatively rigid coupler and unlike the plurality of substantially identical couplers, the one more coupler having like second connectors fixed opposite ends and to an orthogonally adjacent edge with each second connector adapted to mate with a corresponding first connector whereby the additional coupler may also provide interconnection between pairs of conductor carrying members extending generally parallel to one another and may also provide interconnection between pairs of conductor carrying members extending generally perpendicular to one another.

4. The prewired electrical distribution member of claim 1 wherein the elongated channel is formed from three joinable members, the first adapted to be fastened to a wall, the second adapted to snap over the first enclosing the power carrying conductor compartment and forming a portion of the communication wiring compartment, and the third closing the communication wiring compartment.

5. The prewired electrical distribution member of claim 1 wherein the plurality of relatively rigid conductor carrying members are of varying lengths, and further comprising a further relatively rigid conductor carrying member having like first connectors fixed to opposite ends thereof and being longitudinally telescopically retractable and extendable to compensate for variations in the separation between adjacent relatively rigid couplers.

6. A prewired electrical distribution system adapted to be fixed to and extend along a surface for distributing electrical energy comprising:
   a plurality of relatively rigid conductor carrying members having like first connectors fixed to opposite ends thereof;
   a plurality of substantially identical relatively rigid couplers having like second connectors fixed to opposite ends thereof with each second connector adapted to mate with a corresponding first connector whereby the couplers may provide interconnection between pairs of conductor carrying members;
   each of the relatively rigid conductor carrying members comprising an elongated channel of relatively uniform cross-section section throughout its extent, the channel being longitudinally divided into at least two separate raceways, one for receiving power carrying conductors and the other for receiving communication wiring.

7. The prewired electrical distribution member of claim 6 wherein the elongated channel is formed from three joinable members, the first adapted to be fastened to a surface, the second adapted to snap over the first enclosing the power carrying conductor raceway and forming a portion of the communication wiring raceway, and the third closing the communication wiring raceway.

8. The prewired electrical distribution member of claim 6 wherein each of the relatively rigid conductor carrying members comprise three extruded plastic channel portions.

9. In a prewired electrical distribution system adapted to be fixed to and extend along a surface for distributing electrical energy, a plurality of relatively rigid conductor carrying members each comprising an elongated channel of relatively uniform cross-section throughout its extent, the channel being longitudinally divided into at least two separate raceways, one for receiving power carrying conductors and the other for receiving communication wiring, the channel being formed from three joinable members including a first member adapted to be fastened to a surface, a second member adapted to snap over the first member to enclose the power carrying conductor raceway and to form a portion of the communication wiring raceway, and a third member closing the communication raceway.

10. The system of claim 9, wherein the first member includes a base adapted to be secured to the surface and a cover for securing the power carrying conductors to the base.

11. The system of claim 10, wherein the base and the cover cooperate to divide the power carrying conductor raceway into to separate compartments.

12. The system of claim 10, wherein the base and the cover are formed from metal and the second and third members are formed from a plastic material.

13. The system of claim 9, wherein the first member includes a base adapted to be secured to the surface, and the second member is configured to snap over the base to enclose the power carrying raceway.

14. The system of claim 13, wherein the second member includes a generally planar front wall portion extending beyond the base to a define a portion of the communication wiring raceway.

15. The system of claim 14, wherein the third member includes a top cap configured to snap in place against the second member to enclose the communication wiring raceway.

16. The system of claim 9, further comprising a connector coupled to each power carrying conductor at opposite ends of the conductor carrying member to permit the power carrying conductors to be electrically coupled to an adjacent component.

17. A conductor carrying member for use in a prewired electrical distribution system adapted to be fixed to and extend along a surface for distributing electrical energy, the conductor carrying member comprising:
   a first section coupled to said surface for receiving a power carrying conductor;
   a second section coupled to the first section to enclose the first section to form a power carrying conductor raceway, the second section also forming a portion of a communication wiring raceway adjacent to the power carrying conductor raceway; and
   a third section coupled to the second section to enclose the communication raceway.

18. The conductor carrying member of claim 17, wherein the first section includes a base adapted to be secured to the surface and a cover for securing the power carrying conductor to the base.

19. The conductor carrying member of claim 18, wherein the base and the cover cooperate to divide the power carrying conductor raceway into at least two separate compartments.

20. The conductor carrying member of claim 18, wherein the base and the cover are formed from metal and the second and third sections are formed from a plastic material.

21. The conductor carrying member of claim 17, wherein the first section includes a base adapted to be secured to the surface, and the second section is configured to snap over the base to enclose the power carrying raceway.

22. The conductor carrying member of claim 21, wherein the second section includes a generally planar front wall portion extending beyond the base to define a portion of the communication wiring raceway.

23. The conductor carrying member of claim 22, wherein the third section includes a top cap configured to snap in place against the second section to enclose the communication wiring raceway.

24. The conductor carrying member of claim 17, further comprising a connector coupled to each power carrying conductor at opposite ends of the conductor carrying member to permit the power carrying conductors to be electrically coupled to an adjacent component.

25. An assembly for coupling first and second spaced apart electrical conductors together, the assembly being adapted for use in a prewired electrical distribution system fixed to and extending along a surface for distributing electrical energy, the assembly comprising:

a first generally planar member having a first conductive section formed on a surface thereof and a first contact coupled to the first conductive section, means for coupling the first conductive section to the first electrical conductor, a second generally planar member having a second conductive section formed on a surface thereof and a second contact coupled to the second conductive section, means for coupling the second conductive section to the second electrical conductor, and means for slidably coupling the first and second generally planar members together so that the first contact engages the second conductive section and the second contact engages the first conductive portion to couple the first and second conductive portions together electrically, thereby providing an extendable and retractable electrical path from the first electrical conductor coupled to the first conductive section to the second electrical conductor coupled to the second conductive section to compensate for variations in distance between the first and second electrical conductors.

26. The assembly of claim 25, wherein the first and second contacts include spring wiper contacts which engage the first and second conductive sections, respectively, with a predetermined force.

27. The assembly of claim 25, wherein the first conductive section is crimped to the first electrical conductor and the second conductive section is crimped to the second electrical conductor.

28. The assembly of claim 27, wherein the first and second conductors are insulated conductors.

* * * * *